A. P. SCHMUCKER.
MEANS FOR THE TRANSMISSION OF POWER.
APPLICATION FILED JAN. 21, 1907. RENEWED JUNE 3, 1911.
1,008,202.
Patented Nov. 7, 1911.
4 SHEETS—SHEET 1.
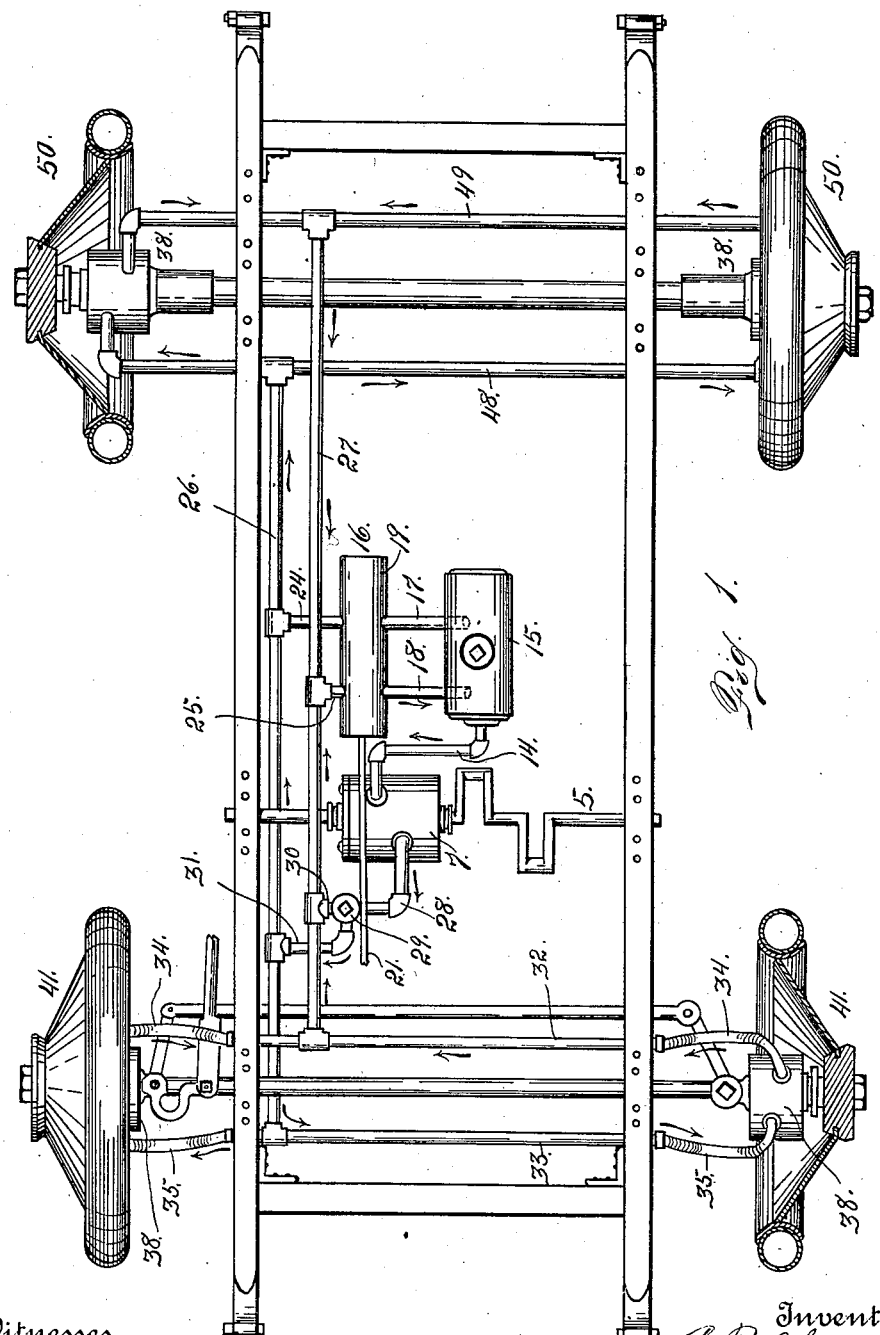

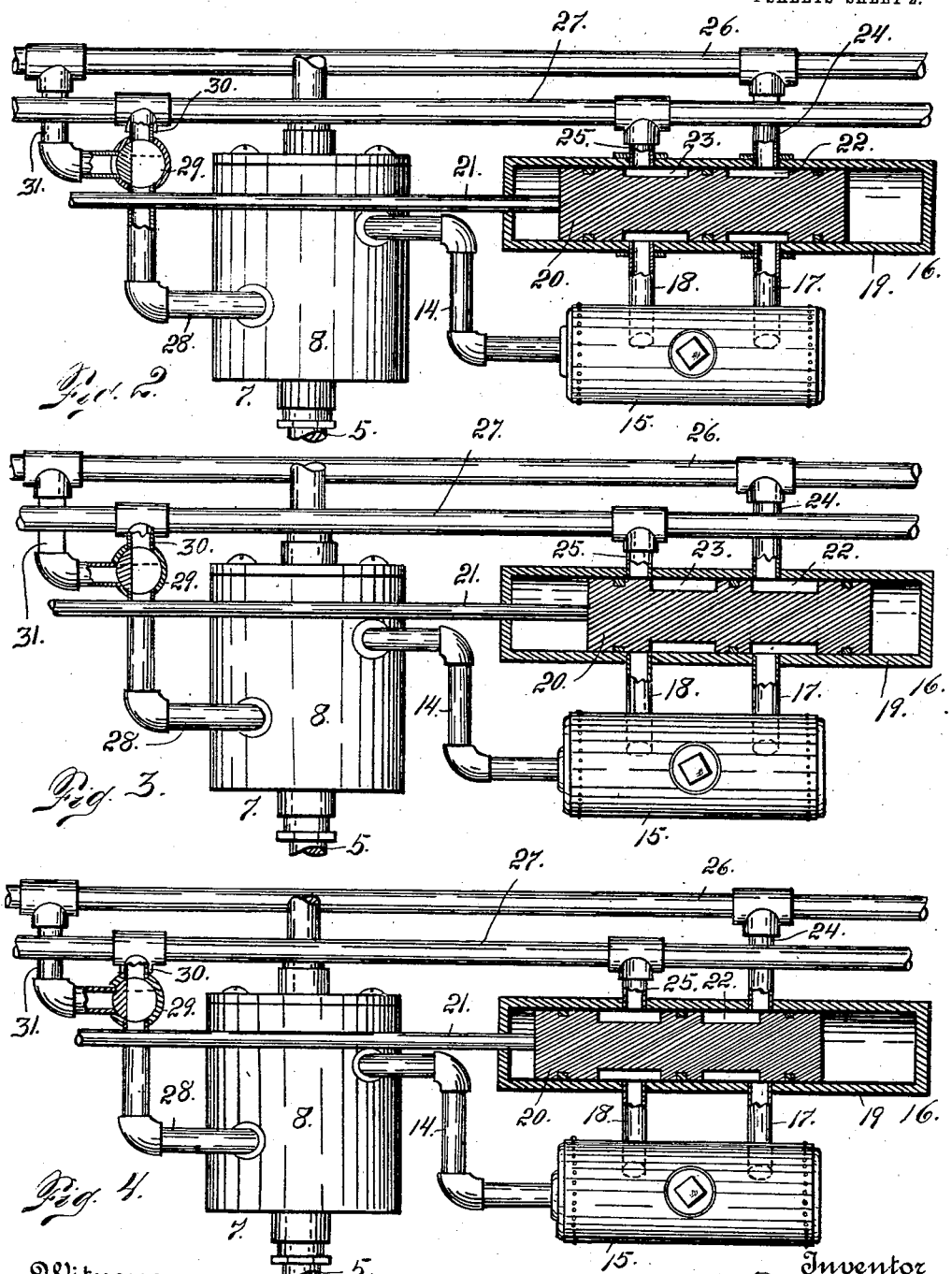

A. P. SCHMUCKER.
MEANS FOR THE TRANSMISSION OF POWER.
APPLICATION FILED JAN. 21, 1907. RENEWED JUNE 3, 1911.

1,008,202.

Patented Nov. 7, 1911.

4 SHEETS—SHEET 3.

Witnesses
Otto E. Haddick.
Dena Nelson.

Inventor
A. P. Schmucker.
By
Attorney

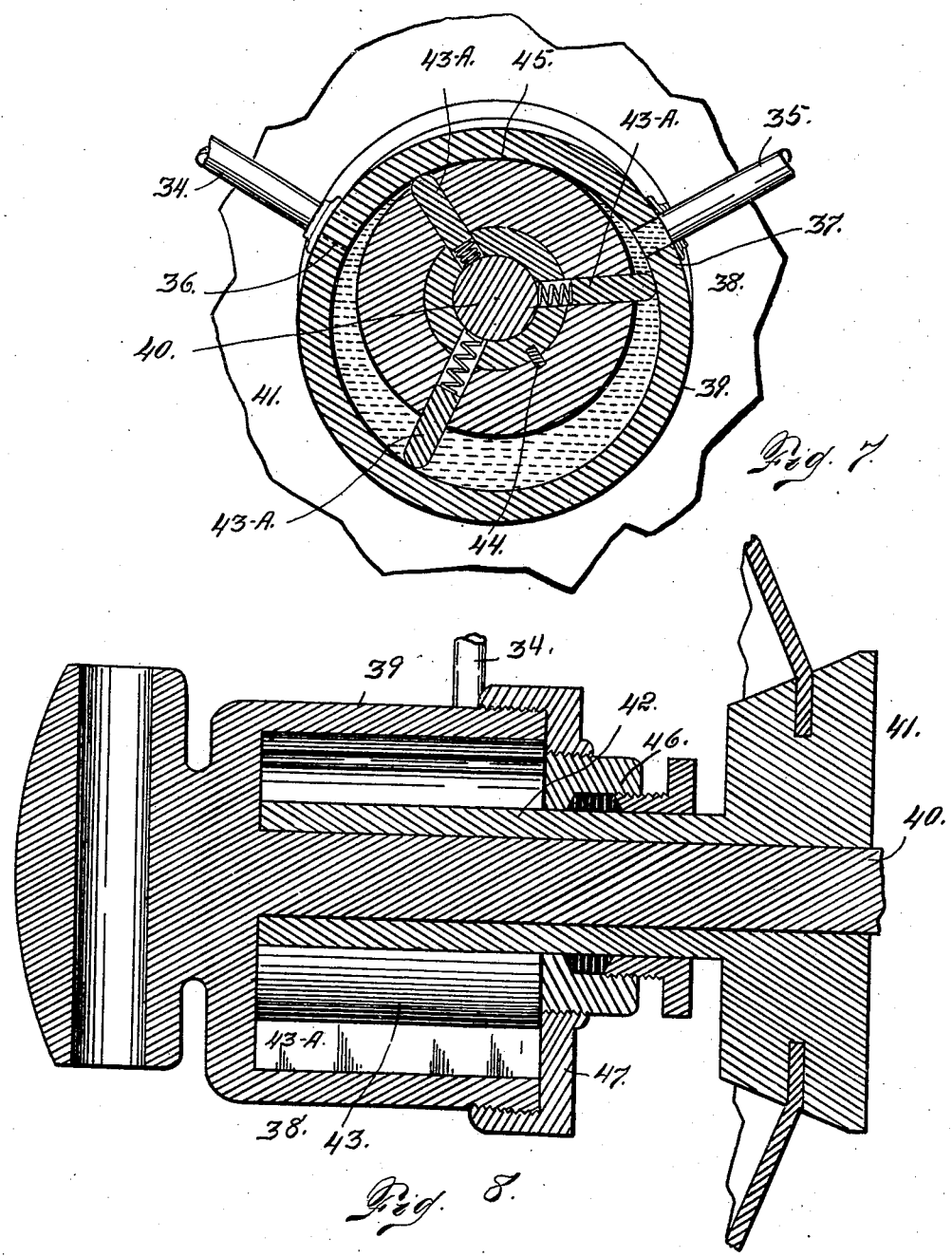

UNITED STATES PATENT OFFICE.

ALFRED P. SCHMUCKER, OF DENVER, COLORADO.

MEANS FOR THE TRANSMISSION OF POWER.

1,008,202.

Specification of Letters Patent.

Patented Nov. 7, 1911.

Application filed January 21, 1907, Serial No. 353,270. Renewed June 3, 1911. Serial No. 631,091.

*To all whom it may concern:*

Be it known that I, ALFRED P. SCHMUCKER, a citizen of the United States, residing in the city and county of Denver and State of Colorado, have invented certain new and useful Improvements in Means for the Transmission of Power; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to means for transmitting power from a driving shaft to the wheels of a vehicle, through the agency of a liquid, preferably oil.

My improved construction comprises a rotary pump mounted on the driving shaft of the vehicle, rotary motors mounted to operate the respective wheels of the vehicle, pipes for circulating the liquid, a tank connected with the main pump, and a throttle valve for controlling the circulation of the liquid, whereby the latter may be made to circulate through the driving pump and the reservoir without imparting movement to the vehicle; or may be made to pass to the rotary motors for operating the wheels in either direction as may be desired. Through the instrumentality of the throttle valve, the entire capacity of the pump may be utilized to drive the vehicle, or only a portion of the capacity as may be desired. The unused portion of the liquid will simply circulate idly through the storage tank and pump as will be readily understood.

Having briefly outlined my improved construction, I will proceed to describe the same in detail, reference being made to the accompanying drawing in which is illustrated an embodiment thereof.

Figure 5:
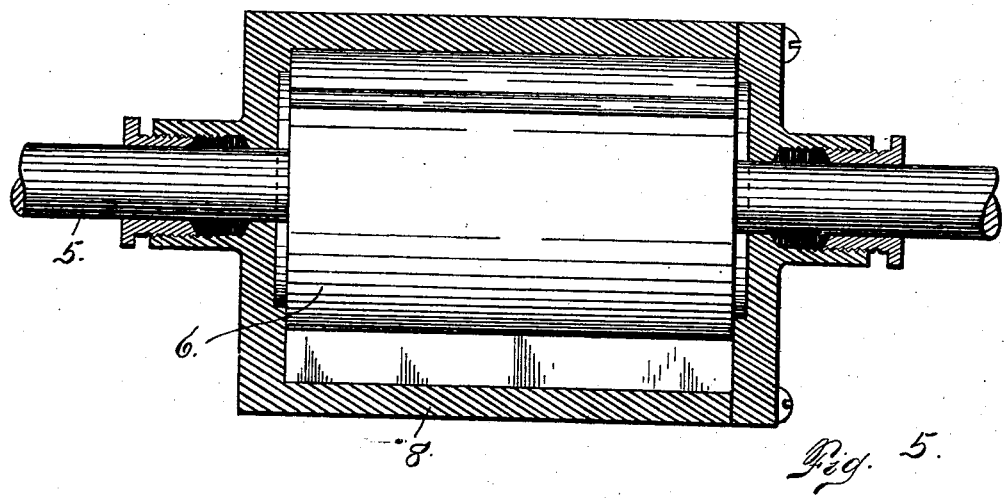
Figure 6:
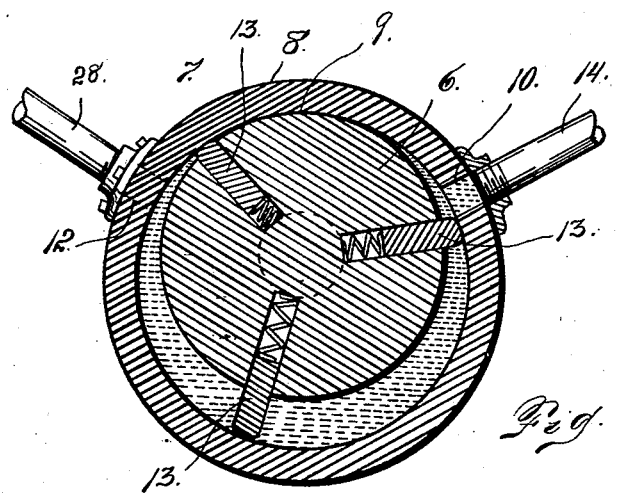

In this drawing, Figure 1 is a top plan view of a vehicle equipped with my improved power transmission mechanism, two of the wheels being shown in section, to better illustrate the rotary motors connected therewith. Fig. 2 is a fragmentary plan view of the mechanism for circulating the liquid, parts being shown in section. Figs. 3 and 4 are similar views showing the throttle valve in different relative position. Fig. 5 is a longitudinal section taken through the casing of the rotary pump. Fig. 6 is a cross section of the said pump. Fig. 7 is a cross section taken through one of the rotary motors. Fig. 8 is a longitudinal section taken through the motor shown in connection with a wheel which is mostly broken away.

The same reference characters indicate the same parts in all the views.

Let the numeral 5 designate the crank shaft of an automobile or self-propelled vehicle. This shaft will be rotated in the usual or ordinary way as by an explosive engine or other motor. Upon this shaft is made fast a cylindrical piston 6 of a rotary pump 7. This pump is provided with a stationary casing 8 in which the piston is mounted to rotate with the shaft, the said piston being eccentrically mounted in the casing and having its outer surface tangential to the inner wall of the casing at a point 9 located between the inlet and outlet ports 10 and 12 of the pump casing. The piston 6 is provided with a number of spring-actuated blades 13 operating in the usual manner as the piston rotates with the shaft 5. In other words as this piston is rotated the liquid is drawn through the inlet port 10 from a suitable source and expelled through the outlet port 12. Connected with the inlet port 10 is a pipe 14 leading to a tank or reservoir 15. The reservoir is connected with a throttle valve 16 by pipes 17 and 18. This throttle valve is composed of a casing 19, and a piston 20 having a stem 21 for manipulating purposes. This stem may be connected with any suitable lever device (not shown), whereby the piston may be manipulated as desired for the purpose of regulating the circulation of the liquid. This piston 20 is provided with two circumferential grooves forming chambers 22 and 23. These chambers may be made to communicate with the pipes which I will designate 24 and 25 respectively. By means of the connections 24 and 25 the throttle valve is connected with longitudinally disposed pipes 26 and 27 respectively.

Connected with the exit port 12 of the pump casing 8 is a pipe 28 leading to a valve 29. The casing of this valve is connected with the pipe 27 by a short pipe 30; and with the pipe 26 by a short pipe 31. When this valve is adjusted as shown in full lines in Figs. 2, 3 and 4, the liquid from the pump will pass first to the pipe 27, while when the valve is adjusted as shown by dotted lines in the same views the liquid will pass first to the pipe 26. The valve 29 may be termed a reversing valve since when it is turned to the position shown in dotted lines, the vehicle will be propelled forwardly; while when it is thrown to the position shown in full lines, the vehicle will be reversed and the wheels driven rearwardly.

The manner of connecting the rotary motor of each wheel with the pump will now be described. The front part of the vehicle frame is provided with two transversely disposed pipes designated 32 and 33, respectively. The pipe 32 is in direct communication with the pipe 27, while the pipe 33 is in direct communication with the pipe 26. Connected with each extremity of the pipe 32 is a hose pipe or flexible conduit 34; while connected with each extremity of the pipe 33 is a similar hose pipe or conduit 35. These flexible extensions of the rigid pipes, are made necessary in order to permit the manipulation of the forward wheels of the vehicle for steering purposes. The steering mechanism of the vehicle will not be described since nothing is claimed thereon. The individual pipes of each pair 34 and 35, are respectively connected with the inlet and outlet ports 36 and 37 of a rotary motor 38. While the last named ports are designated inlet and outlet it will be understood that these terms are used only for convenience of description since either port if it is an inlet port when the vehicle is moving forwardly, will become an outlet port when the vehicle is moving rearwardly. The motor 38 is provided with a casing 39 which as shown in the drawing is formed integral with a stub axle 40 of each forward wheel 41. Each wheel 41 is provided with a hollow journal 42 through which the stub axle passes. Each hollow journal 42 is connected with a rotary piston 43 by a key 44 whereby the wheel and piston will rotate in unison. This piston carries spring-actuated blades 43^A and is eccentrically mounted in the casing 39 and is tangential to the inner wall of the casing at a point 45 between the inlet and outlet ports 36 and 37 of the casing. The extremity of the casing 39 through which the hollow journal enters is provided with a stuffing box 46 held in place by a screw cap 47.

Mounted on the rear part of the vehicle frame are two transversely disposed pipes 48 and 49. The pipe 48 is connected at its opposite extremities with the inlet ports of the motors 38 for operating the rear wheels 50 of the vehicle, while the pipe 49 is connected at its opposite extremity with the exit ports of the same motors. The only difference between the connection with the motors in the front and rear of the vehicle, is that in the rear the flexible members of the pipes are not required for obvious reasons.

Now if it be assumed that the piston of the throttle valve is shifted to open communication between both pipes 24 and 25 and the pipes 17 and 18, and if it is also assumed that the driving shaft 5 is in motion, the liquid will be circulated by the pump without operating the vehicle in whichever position the valve 29 is placed, that is to say whether in the position shown in full lines or in dotted lines in Figs. 2, 3 and 4. Now if we assume that this piston is shifted to open communication with the pipes 25 and 18, and cut off communication between pipes 24 and 17, and if we also assume that the valve 29 is in the dotted line position in Figs. 2, 3 and 4, the operation of the pump will drive the liquid first through the casing of the valve 29, thence through the pipe 31 to the pipe 26, thence from the pipe 26 to the pipes 33 and 48, thence into and through the motors of the four wheels of the vehicle as indicated by the arrows in Fig. 1, thence back through the pipes 32 and 49 to the pipe 27 and thence through the pipe 25 into the casing of the throttle valve, thence through the pipe 18 to the reservoir 15, and thence back to the pump through the pipe 14. Under these circumstances the full power of the pump is transmitted to the vehicle wheels and the machine is propelled in the forward direction. If the valve 29 be thrown to the full line position in Figs. 2, 3 and 4, the liquid would first pass to the pipe 27, and thence to the pipes 32 and 49, and thence through the pipes connected with the wheel motors in the direction opposite that indicated by the arrows, and thence back to the pipe 26, and thence through the pipe 24, the throttle valve casing 19, to the reservoir 15 and thence to the pump. In this case, however, the throttle valve must also be shifted to cut off communication between the throttle valve casing and the pipes 18 and 25 and open communication between the same casing and the pipes 17 and 24.

Assuming that the vehicle is moving in the forward direction and it is not desired to run at a speed corresponding with the full capacity of the pump, the throttle valve will be shifted to partly open the communication between the pipes 24 and 17 and the throttle valve casing, allowing a portion of the liquid from the pipe 26 to return idly through the chamber 22 of the throttle valve while the other portion acts to drive the wheels of the vehicle. In this way the speed may be perfectly controlled. This arrangement of the throttle valve piston is illustrated in Fig. 4. Again if we assume that the full power of the pump is acting on the wheels of the vehicle or in other words that the latter is running at full speed, if the operator wishes to check the speed or apply the brakes so to speak, he may shift the throttle valve to retard the return of the liquid through the chamber 23 of the valve and its connections, by partly closing or cutting off communication between the chamber 23 of the throttle valve and the pipes 18 and 25.

It is evident that where the wheels of the vehicle are made fast to an axle, that the rotary motor may be mounted to rotate the axle. Hence it must be understood that the invention is not limited to the specific construction disclosed except so far as may be necessary in view of the state of the art and the scope of the appended claim.

Having thus described my invention, what I claim is:

The combination with a self-propelled vehicle, of a rotary pump operated by the driving shaft of the vehicle, a liquid reservoir, rotary motors for operating each wheel of the vehicle, each motor comprising a casing surrounding the journal of the vehicle wheel, a rotary piston located in the casing and coaxially connected with the wheel journal, the said casing being provided with separated inlet and outlet ports for the motive fluid, the piston being tangential to the inner wall of the casing at a point between the said ports, and having spring actuated blades engaging the inner wall of the casing, the said blades being acted upon by the motive fluid, the motors on each axle having a supply and exhaust pipe communicating therewith, a second supply and exhaust pipe connected at their opposite extremities with the first named supply and exhaust pipes, respectively, the said pipes being in communication with the pump and reservoir, whereby the operation of the pump circulates the liquid through the motors, the reservoir, and thence back to the pump, a throttle valve located between the last named pipes and the reservoir for controlling the circulation, and means located between the pump and the said pipes for reversing the circulation through the pipes and the motors, substantially as described.

In testimony whereof I affix my signature in presence of two witnesses.

ALFRED P. SCHMUCKER.

Witnesses:
A. J. O'BRIEN,
DENA NELSON.